No. 733,578. PATENTED JULY 14, 1903.
G. EGLY.
PROCESS OF SMELTING METALS AND METAL COMPOUNDS.
APPLICATION FILED JAN. 14, 1903.
NO MODEL.
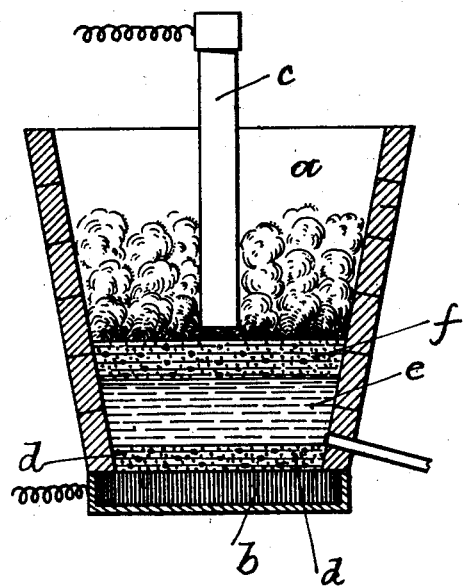
WITNESSES
Anton Glatzner
E. O. Hildebrand
INVENTOR
Georg Egly
By George T. Massie
His ATTORNEYS No. 733,578. Patented July 14, 1903.

UNITED STATES PATENT OFFICE.

GEORG EGLY, OF CHARLOTTENBURG, GERMANY.

PROCESS OF SMELTING METALS AND METAL COMPOUNDS.

SPECIFICATION forming part of Letters Patent No. 733,578, dated July 14, 1903.

Application filed January 14, 1903. Serial No. 139,069. (No specimens.)

*To all whom it may concern:*

Be it known that I, GEORG EGLY, chemist, a subject of the German Emperor, residing at 24 Leibnizstrasse, Charlottenburg, near Berlin, Germany, have invented certain new and useful Improvements is Processes of Smelting Metals and Metal Compounds; and I do hereby declare the following to be a full, clear, and exact description of the invention, such as will enable others skilled in the art to which it appertains to make and use the same.

In the reduction of metals in the electrical furnace, especially in the preparation of nickel by reduction of protoxid of nickel in the electrical furnace in presence of carbon, the molten metal easily takes up carbon from the electrodes, thereby appreciably diminishing the value of the product. According to the present invention this inconvenience is avoided by the formation of a scoria of almost two centimeters thickness. This slag or scoria is in my invention composed of a substance which is chemically inert or undecomposable to as high a degree as possible at high temperatures and in the presence of carbon and metals which will not melt or which melt only with great difficulty at the temperatures at which the reduction of the nickel oxid takes place and is volatile only to a very small extent and which at the same time is a good conductor of electricity. Under this invention a scoria or slag of this nature is formed over the lower electrode of an electrical smelting-furnace previous to the smelting operation, and the fact that the same will remain solid or nearly solid at the melting temperatures will enable it to remain over the said electrode, and thus screen the metal formed at the reduction process against the absorption of carbon from the said electrode. Magnesia is a substance especially well fitted for the formation of such a scoria, being indifferent to high temperatures to a remarkable degree. Under my invention I therefore add to magnesia a substance conducting electricity in a cold state or at red heat and which is chemically inert and non-volatile and undecomposable at high temperatures—such, for example, as fluorspar, titanium dioxid, titanium monoxid, or the like. Admixtures of this nature materially add to the conductivity of the magnesia without lowering the melting-point of the mixtures below the heat to which they are subjected in the smelting operation. The proportions in which these admixtures are added to the magnesia in my invention are about twenty to twenty-five per cent., by weight.

After the lower electrode, which in the case of continuous currents is the cathode, is covered by a scoria of the nature described it is allowed to cool to red heat, and then the reduction of the protoxid of nickel is carried out, preferably, by continuous current of low density. The current density employed is preferably about two amperes to the square centimeter, although good results may also be obtained at lower-current densities.

This invention may be carried out in a great variety of ways, as will be readily understood.

In the accompanying drawing I have shown the preferred form of apparatus for carrying out the said invention.

In the drawing, $a$ represents the melting-pot of the electric smelting-furnace, which may be composed of any sufficiently refractory material, such as fire-brick; $b$, the lower electrode, (cathode in the case of a continuous current,) and $c$ the upper electrode.

$d$ represents the slag or scoria covering, made of slag or scoria, as above set forth.

$e$ represents the metal, and $f$ the upper layer of slag, formed in the usual manner.

The metal is thus separated from the lower electrode by the scoria at the bottom, which remains solid, and from the upper electrode by a layer of fluid scoria floating on the surface of the fluid product during the reduction or smelting, so that the absorption of carbon from the electrodes by the metal is altogether avoided.

The same process can of course be also used for smelting and reducing other metals in the electrical furnace. It may be also used with great advantage for the smelting of metals—for instance, of nickel or wrought-iron waste from which cast-steel is to be manufactured. In this case so much scorifying material is added to the metal to be smelted that a covering scoria will be formed in a short time.

Having now particularly described and ascertained the nature of my said invention and the manner in which the same is to be performed, I declare that what I claim is—

1. Process for smelting metals consisting in smelting the same in an electric furnace the lower carbon electrode of which is covered by a scoria possessing a sufficient conductivity and remaining solid or nearly solid at the temperature at which the smelting process takes place.

2. Process for smelting metals consisting in smelting the same in an electric furnace the lower carbon electrode of which is covered by a scoria composed of a mixture of magnesia and an admixture conducting electricity in a cold state or at red heat and indifferent to high temperatures.

3. Process for smelting nickel, wrought-iron waste or similar metals consisting in smelting the same in an electric furnace the lower carbon electrode of which is covered by a scoria.

4. Process of smelting and reducing metal compounds consisting in smelting and reducing the same in an electric furnace the lower carbon electrode of which is covered by a scoria possessing a sufficient conductivity and remaining solid or nearly solid at the temperature at which the smelting process takes place.

In testimony whereof I have affixed my signature in presence of two witnesses.

GEORG EGLY.

Witnesses:
WOLDEMAR HAUPT,
WILLIAM NEUMANN.